United States Patent
Kee et al.

(10) Patent No.: US 8,928,529 B2
(45) Date of Patent: Jan. 6, 2015

(54) POSITIONING SYSTEM AND METHOD BASED ON RADIO COMMUNICATION APPARATUS COMPRISING MULTIPLE ANTENNA

(75) Inventors: Changdon Kee, Seoul (KR); Taikjin Lee, Incheon (KR)

(73) Assignee: SNU R&DB Foundation, Seoul (KR)

( * ) Notice: Subject to any disclaimer, the term of this patent is extended or adjusted under 35 U.S.C. 154(b) by 480 days.

(21) Appl. No.: 13/321,925

(22) PCT Filed: Feb. 11, 2010

(86) PCT No.: PCT/KR2010/000875
§ 371 (c)(1),
(2), (4) Date: Nov. 22, 2011

(87) PCT Pub. No.: WO2010/137790
PCT Pub. Date: Dec. 2, 2010

(65) Prior Publication Data
US 2012/0075145 A1      Mar. 29, 2012

(30) Foreign Application Priority Data

May 27, 2009  (KR) ............... 10-2009-0046611
Dec. 24, 2009  (KR) ............... 10-2009-0131082

(51) Int. Cl.
*G01S 3/02* (2006.01)
*G01S 5/04* (2006.01)
*G01S 3/74* (2006.01)
*G01S 5/10* (2006.01)

(52) U.S. Cl.
CPC ..... *G01S 3/74* (2013.01); *G01S 5/10* (2013.01)
USPC ............... 342/464; 342/445; 342/463

(58) Field of Classification Search
CPC ............... G01S 3/46; G01S 3/48; G01S 5/14
USPC ............. 342/442, 445, 458, 463–465; 455/456.1, 456.6
See application file for complete search history.

(56) References Cited

U.S. PATENT DOCUMENTS

| | | | |
|---|---|---|---|
| 7,116,701 B2 | 10/2006 | Mesecher | |
| 8,170,830 B2* | 5/2012 | Jacobs et al. | 702/150 |

(Continued)

FOREIGN PATENT DOCUMENTS

| | | |
|---|---|---|
| JP | 2007-212424 A | 8/2007 |
| JP | 2009-047538 A | 3/2009 |

(Continued)

OTHER PUBLICATIONS

PCT International Search Report and Written Opinion, PCT/KR2010/000875, Sep. 30, 2010, 6 Pages.

*Primary Examiner* — Dao Phan
(74) *Attorney, Agent, or Firm* — Fenwick & West LLP (57) ABSTRACT

This disclosure relates to a positioning system and a method based on a radio communication apparatus including multiple antennas, and more particularly, to a positioning system and a method of positioning a terminal using a communication apparatus including multiple antennas. The positioning system and the method based on a radio communication apparatus including multiple antennas calculate a position of a terminal using a single communication apparatus in which the multiple antennas are mounted and can calculate the position of the terminal more accurately by using two or more communication apparatuses. In addition, the positioning system and the method communicate with a transception apparatus, a relay station, or a wireless access point of an existing communication system, thereby accurately obtaining the position of the terminal.

28 Claims, 7 Drawing Sheets

(56) References Cited

U.S. PATENT DOCUMENTS

2004/0145518 A1\* 7/2004 Toda et al. .............. 342/357.04
2008/0316103 A1 12/2008 Rofougaran et al.
2009/0041145 A1 2/2009 Chockalingam et al.
2009/0186658 A1 7/2009 Jiang et al.

FOREIGN PATENT DOCUMENTS

| | | |
|---|---|---|
| KR | 10-0438804 B1 | 5/2005 |
| KR | 10-0904681 B1 | 6/2009 |
| WO | WO 2009/019714 A1 | 2/2009 |

\* cited by examiner

Fig. 14

POSITIONING SYSTEM AND METHOD BASED ON RADIO COMMUNICATION APPARATUS COMPRISING MULTIPLE ANTENNA

TECHNICAL FIELD

This disclosure relates to a positioning system and a method based on a radio communication apparatus including multiple antennas, and more particularly, to a positioning system and a method for positioning a terminal using a communication apparatus including multiple antennas.

BACKGROUND ART

In general, an existing positioning system is a system using a radio frequency (RF) communication apparatus. As the system using an RF communication apparatus, there are systems based on satellite, ground beacon, wireless LAN (Wi-Fi, WLAN), RFID, active RFID, mobile communication, Bluetooth, UWB, ZigBee, WiBro/WiMax, and broadcasting signals. In order to estimate a position of a user using such a system, several methods have been proposed.

First, there is a recognition-type navigation algorithm used by an RFID-based system. This algorithm is a method used for a system including multiple sensors. In the method, when a user receives a signal from a sensor near the user, only rough position information indicating that the user is positioned near the sensor is provided. Therefore, position accuracy is very low, and continuous positioning is impossible. In addition, a number of sensors such as RFID tags have to be installed, resulting in an increase in cost.

There is a method of calculating a position by estimating intensity of a received signal. It is a method of creating a database of signal intensities at actual and corresponding positions and comparing the intensity of the received signal to the data in the database, thereby estimating a position of a user. In this method, signal intensities at every location are needed by the database. Thus, it takes much time and cost to construct the database. In addition, there is a problem in that the database has to be reconstructed when an indoor arrangement or environment is changed.

Furthermore, there is a method of calculating a position of a user using triangulation by estimating a distance between a transmitter and a receiver from a received signal. This method is currently used the most, and is relatively reliable as compared with the two above-mentioned methods. However, at least three transmitters need to be installed for the triangulation, and this results in a cost increase.

Besides, there is a method of determining a position by estimating an angle between a transmitter and a receiver from a received signal. This method also needs at least three transmitters installed, resulting in a cost increase.

In addition, in a method of determining a position using a distance and an angle between a transmitter and a receiver, the position can be determined only when the transmitters are widely arranged. In addition, in order to determine a distance and a direction, a ranging signal has to be carried on a carrier signal, and the ranging signal is mainly used to determine a position. The ranging signal is easy to use, however, navigation accuracy thereof is low. In contrast, the carrier signal has high navigation accuracy. However, in order to use the carrier signal, ambiguity of the carrier signal has to be solved. So, there is a difficulty in using the carrier signal.

Due to the limitations of the existing methods, there is a need to propose a positioning system for accurately estimating a position of a user at low costs.

DISCLOSURE OF INVENTION

Technical Problem

This disclosure provides a positioning system and a method based on a radio communication apparatus including multiple antennas, capable of accurately finding a position of a terminal with only one or more communication apparatuses by using the communication apparatus in which multiple antennas are mounted thereby achieving a reduction in cost, and capable of communicating with a transception apparatus, a relay station, or a wireless access point of an existing communication system thereby accurately obtaining the position of the terminal.

Solution to Problem

In one aspect, there is provided a positioning system based on a radio communication apparatus including multiple antennas, including: a communication apparatus including multiple antennas and generating or relaying a communication signal; a terminal communicating with the communication apparatus; and a position calculation module calculating a position of the terminal using a phase difference between signals that are transmitted from the multiple antennas to the terminal.

The position calculation module may be included in the terminal or may be provided separately from the terminal.

The communication signal may be a signal selected from the group consisting of a ranging signal, a carrier signal, and a sub-carrier signal.

The communication apparatus may perform communication in a manner selected from the group consisting of artificial satellite, ground beacon, pseudo-satellite, wireless LAN (Wi-Fi, WLAN), Wibro, mobile communication, Bluetooth, UWB, infrared rays, ultrasonic waves, Zigbee, wireless USB, RFID, active RFID, and broadcasting signals.

The position calculation module may include a position calculation module based on interactive communication for performing interactive communication with the terminal, or a position calculation module based on one-way communication for performing one-way communication with the terminal.

In another aspect, there is provided a positioning method based on a radio communication apparatus including multiple antennas, including: allowing a communication apparatus which includes multiple antennas for generating or relaying a communication signal to communicate with a terminal; and calculating a position of the terminal using a phase difference between signals transmitted from the multiple antennas to the terminal.

Advantageous Effects of Invention

The existing positioning system and method have to be provided with multiple communication apparatuses. However, a positioning system and a method according to an embodiment of this disclosure can accurately estimate a position using one or more communication apparatuses. That is, it is possible to accurately calculate a position of a terminal using a single communication apparatus. In addition, as the number of communication apparatuses increases, it is possible to calculate the position of the terminal more accurately.

Therefore, it is possible to configure the positioning system at lower cost. Furthermore, an existing communication system may be applied as is or slightly modified so as to be applied to the embodiment of the disclosure, without requiring an additional system for positioning.

BRIEF DESCRIPTION OF DRAWINGS

The above and other aspects, features and advantages of the disclosed exemplary embodiments will be more apparent from the following detailed description taken in conjunction with the accompanying drawings in which.

BEST MODE FOR CARRYING OUT THE INVENTION

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Figure 1:
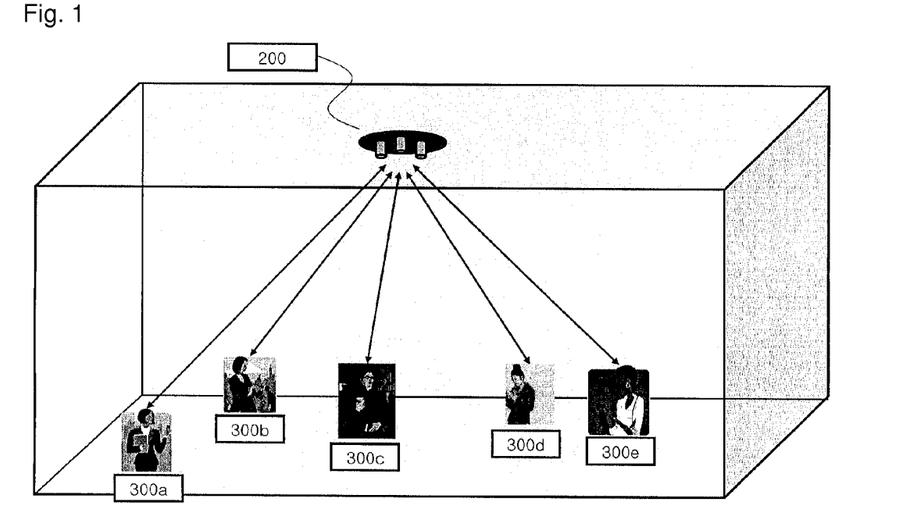
FIG. 1 is a diagram schematically illustrating a positioning system based on a radio communication apparatus including multiple antennas according to an embodiment of the disclosure.

FIG. 1 is a diagram schematically illustrating a positioning system based on a radio communication apparatus including multiple antennas according to an embodiment of the disclosure.

Referring to FIG. 1, a plurality of users 300a to 300e are connected to a single communication apparatus 200 in a space to check their positions. That is, even when only the single communication apparatus 200 is used, the plurality of terminals 300a to 300e may calculate their positions relatively accurately.

Figure 2:
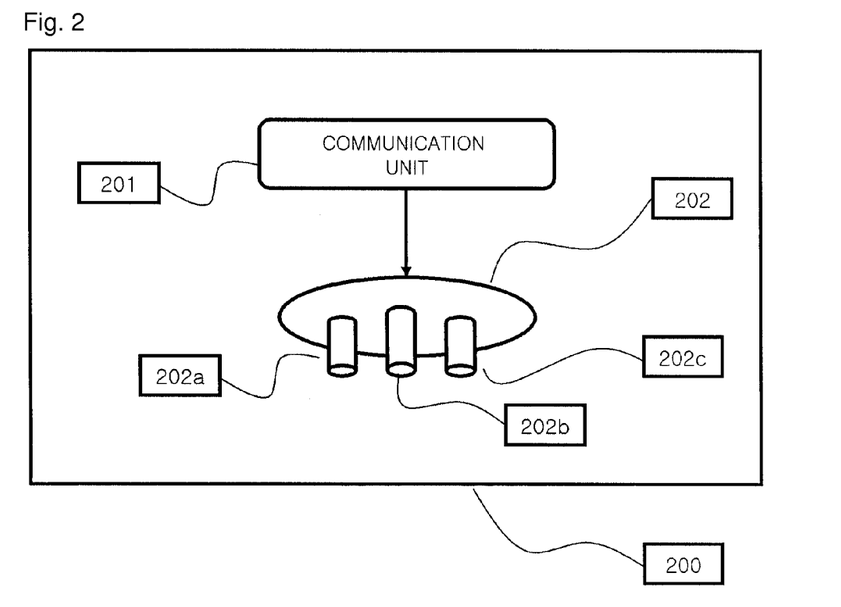
FIG. 2 is a diagram illustrating a communication apparatus 200 according to the embodiment of the disclosure in detail.

FIG. 2 is a diagram illustrating the communication apparatus 200 according to the embodiment of the disclosure in detail.

The communication apparatus 200 includes a single communication unit 201 for generating or relaying a communication signal and multiple antennas 202a to 202c for communicating with terminals of users. A communication apparatus including the communication apparatus 200 according to the embodiment of the disclosure includes an apparatus which does not receive or transmit data and enables transmission and transception of radio signals, as well as an apparatus which receives and transmits data. In addition, multiple antennas including the multiple antennas 202a to 202c according to the embodiment of the disclosure have an antenna array type. A distance between the antennas may be equal to or shorter than a half the wavelength of a radio frequency (RF) signal or equal to or longer than a half the wavelength thereof depending on a position calculation process.

In general, the communication signal may be a signal selected from the group consisting of a ranging signal, a carrier signal, and a sub-carrier signal. The ranging signal is easy to use as compared with the carrier signal but has a disadvantage of low navigation accuracy. On the other hand, the carrier signal has very high precision as compared with the general ranging signal, so that a position can be calculated much more accurately. In a case of GPS which is a satellite navigation system, precision of the ranging signal is several meters, whereas the precision of the carrier signal is several centimeters.

In general, in order to use the carrier of the radio frequency signal, ambiguity of the carrier has to be solved. Due to this problem, the method of calculating a position using the carrier is complex and cannot be easily implemented. However, when the distance between the antennas is equal to or shorter than a half the wavelength of the carrier of the radio frequency signal, ambiguity of the carrier is solved, so that the calculating of the position using the carrier is simplified. How the ambiguity of the carrier is solved when the distance between the antennas is equal to or shorter than a half the wavelength thereof will be described as follows.

A carrier signal transmitted from an i-th antenna from among the two or more antennas can be simply modeled by the following equation. The following equation does not consider various error components such as tropospheric delay errors generally included in modeling. This is because the error components are relatively smaller values than the main components.

MathFigure 1

$$\phi^i = d^i + B + N^i \cdot \lambda \quad \text{[Math. 1]}$$

where
$d^i$: actual distance between the i-th antenna and a terminal of a user
B: time error of the terminal of the user
$N^i$: ambiguity of a carrier signal
$\lambda$: wavelength of the carrier signal.

In Equation 1, $N^i$ represents the ambiguity of the carrier signal and has an integer value. That is, since the carrier signal is a kind of wave signal, the wavelength thereof becomes an ambiguous value. In order to calculate the value and solve the ambiguity, generally, the GPS uses searching. Indoors, it is difficult to apply the searching method as it is. Therefore, for this, the user has to move to a predetermined extent or larger indoors, and this requires a calculation time of several minutes.

When a carrier signal of a j-th antenna is subtracted from that of the i-th antenna, the following equation results.

MathFigure 2

$$^i\nabla^j\phi = \phi^i - \phi^j = {^i\nabla^j}d + {^i\nabla^j}N \cdot \lambda \quad \text{[Math. 2]}$$

where
$^i\nabla^j d = d^i - d^j$
$^i\nabla^j N = N^i - N^j$

When both sides are divided by the wavelength, the following equation is obtained.

MathFigure 3

$$\frac{^i\nabla^j\phi}{\lambda} = \frac{^i\nabla^j d}{\lambda} + {^i\nabla^j}N \quad \text{[Math.3]}$$

Here, since the distance between the two antennas is equal to or shorter than a half the wavelength, inequalities as represented by Equations 4 and 5 are obtained.

MathFigure 4

$$^i\nabla^j d \leq \frac{\lambda}{2} \quad \text{[Math.4]}$$

MathFigure 5

$$\frac{^i\nabla^j d}{\lambda} \leq \frac{1}{2} \quad \text{[Math.5]}$$

Therefore, Equation 6 is derived.

MathFigure 6

$$\frac{^i\nabla^j\phi}{\lambda} = \frac{^i\nabla^j d}{\lambda} + {^i\nabla^j}N \leq \frac{1}{2} + {^i\nabla^j}N \quad \text{[Math.6]}$$

Here, since we have to obtain distance information,
$^i\nabla^j d$
has to be obtained. In addition, a value obtained from a measured value is
$^i\nabla^j\phi$.
. Therefore, when the following equation is used for calculation, it is possible to calculate an ambiguous integer value
$^i\nabla^j N$
and remove it from a measured value.

MathFigure 7

$$\frac{^i\nabla^j d}{\lambda} = \frac{^i\nabla^j\phi}{\lambda} - \text{round}\left(\frac{^i\nabla^j\phi}{\lambda}\right) \quad \text{[Math.7]}$$

MathFigure 8

$$^i\nabla^j d = \left(\frac{^i\nabla^j\phi}{\lambda} - \text{round}\left(\frac{^i\nabla^j\phi}{\lambda}\right)\right) \cdot \lambda \quad \text{[Math.8]}$$

That is, when the integer value is subtracted from the measured value, actual distance information is obtained.

If the distance between the transmission antennas is equal to or longer than a half the wavelength, ambiguity of the carrier signal has to be solved using an additional algorithm. Since the distance between the antennas is known, solving the ambiguity is relatively easy, and such an additional algorithm can be easily derived through searching or the like by the skilled in the art. Therefore, description of the additional algorithm will be omitted here. Particularly, a multi-input and multi-output (MIMO) system is a system in which multiple antennas are basically mounted. Since the distance between the antennas is generally four times or more the wavelength, this may be applied to the MIMO system. In addition, besides the carrier signal, it is possible to calculate distance information using the above-mentioned method of the carrier signal for the ranging signal. When the ranging signal is used, it is not influenced by the distance between the antennas.

In FIG. 2, the communication unit 201 refers to an apparatus for communication. That is, the communication unit 201 is a module for generating or relaying a general communication or navigation signal, and includes a module for generating or relaying a signal based on artificial satellite, ground beacon, pseudo-satellite, wireless LAN (Wi-Fi, WLAN), Wibro, mobile communication, Bluetooth, UWB, infrared rays, ultrasonic waves, Zigbee, wireless USB, RFID, active RFID, and broadcasting signals. The communication unit 201 may have a reception function for interactive communication. That is, if the communication unit 201 is a one-way module for transmitting a signal, such as a pseudo-satellite, it only has a function of generating or relaying a signal. However, if the communication unit 201 is a two-way module using wireless LAN, Wibro, or a mobile communication network, it has both functions of transmitting and receiving signals.

The antennas 202a to 202c refer to transception modules that actually transmit the signal generated by the communication unit 201. According to the embodiment of the disclosure, the important thing is that the multiple communication antennas 202a to 202c are mounted in the communication apparatus 200. The signal generated by the transmission apparatus is transmitted through the different antennas 202a to 202c, and the terminals receive the signal transmitted from each antenna. Here, since the actual distance between the terminal and the each antenna is different, the signal transmitted from each antenna has a different phase difference depending on the actual distance. Therefore, a phase difference between the signals can be measured. Here, the transmission antenna may be any type of antenna, including a patch type or a helical type. In FIG. 2, only three antennas are illustrated. However, this is only an example, and a case where the communication apparatus includes two, or four or more antennas is included in the content of the embodiment of the disclosure.

Referring back to FIG. 1, the terminals 300a to 300e refer to terminals that the users possess in order to receive the signal transmitted from the communication unit 201. The terminals 300a to 300e may use a communication method based on artificial satellite, ground beacon, pseudo-satellite, wireless LAN (Wi-Fi, WLAN), Wibro, mobile communication, Bluetooth, UWB, infrared rays, ultrasonic waves, Zigbee, wireless USB, RFID, active RFID, broadcasting signals, and the like. When the communication unit employs a wireless LAN, the terminals 300a to 300e may be wireless LAN modules such as notebooks (laptops) and cellular phones using the wireless LAN. The terminals 300a to 300e receive the signal transmitted from each antenna of the communication apparatus and measure a phase difference between the signals. The terminals 300a to 300e may transmit their signals for interactive communication. That is, the terminals 300a to 300e may select one from the interactive communication method that enables transmission and reception of signals and the one-way communication method that only receives signals so as to be used.

The position calculation module (not shown) may be included in the terminals 300a to 300e or provided separately. The module calculates a position of the user using a phase difference between the signals transmitted from the antennas 200a to 200c, the phase difference being calculated by the terminals 300a to 300e. The position calculation module may include a position calculation module based on interactive communication in which interactive communication is performed between the terminals 300a to 300e and the communication apparatus 200, or a position calculation module based on one-way communication in which the terminals 300a to 300e receive communication signals from the communication apparatus 200 in one way. That is, the module to be used is determined depending on the communication methods of the communication unit 201 and the terminals 300a to 300e.

Figure 3:
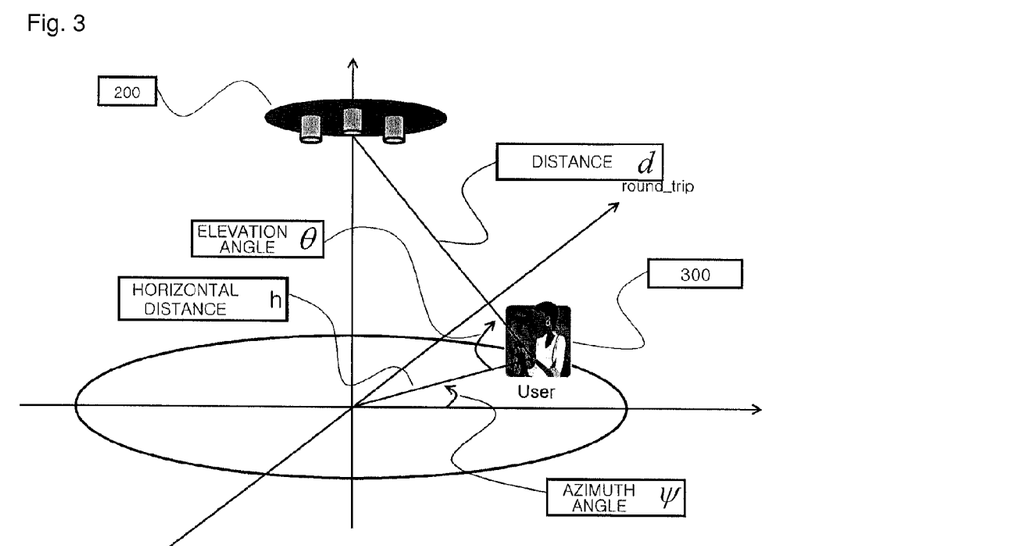
FIG. 3 is a conceptual diagram of a position calculation module of the positioning system based on a radio communication apparatus including multiple antennas according to the embodiment of the disclosure.

FIG. 3 is a conceptual diagram of a position calculation module of the positioning system based on a radio communication apparatus including multiple antennas according to the embodiment of the disclosure. Referring to FIG. 3, the communication apparatus 200 including three antennas is illustrated, and a conceptual two-dimensional position of the terminal 300 with respect to the communication apparatus 200 is illustrated.

Assuming that a user is on a floor and a height of the terminal 300 possessed by the user is substantially constant, the position of the user may be represented two-dimensionally, and the two-dimensional position of the user can be represented by an azimuth angle $\psi$ and a distance $d_{round\_trip}$, or the azimuth angle $\psi$ and an elevation angle $\theta$ as illustrated in FIG. 3. That is, when the azimuth angle $\psi$ and the distance $d_{round\_trip}$, or the azimuth angle $\psi$ and the elevation angle $\theta$ are estimated, the two-dimensional position of the user may be estimated.

In a mathematical approach, when a one-dimensional position is to be estimated, there is one unknown quantity, so that one measurement equation is needed. In a case of two-dimensional, two measurement equations are needed. In order to obtain three-dimensional solutions, three measurement equations are needed. That is, when the number of antennas of the communication apparatus is three as in this embodiment, through subtraction between antennas, the total two measurement equations can be obtained. Therefore, it is possible to estimate a two-dimensional position. In addition, when two antennas are used, it is possible to obtain a one-dimensional position, and when four or more antennas are used, it is possible to obtain a three-dimensional position. Since the expansion of the two-dimensional position calculation algorithm described in this embodiment to the one-dimensional or three-dimensional position calculation algorithm may be derived by the skilled in the art from the following description, description of the one-dimensional or three-dimensional position calculation algorithm will be omitted in this embodiment.

Figure 4:
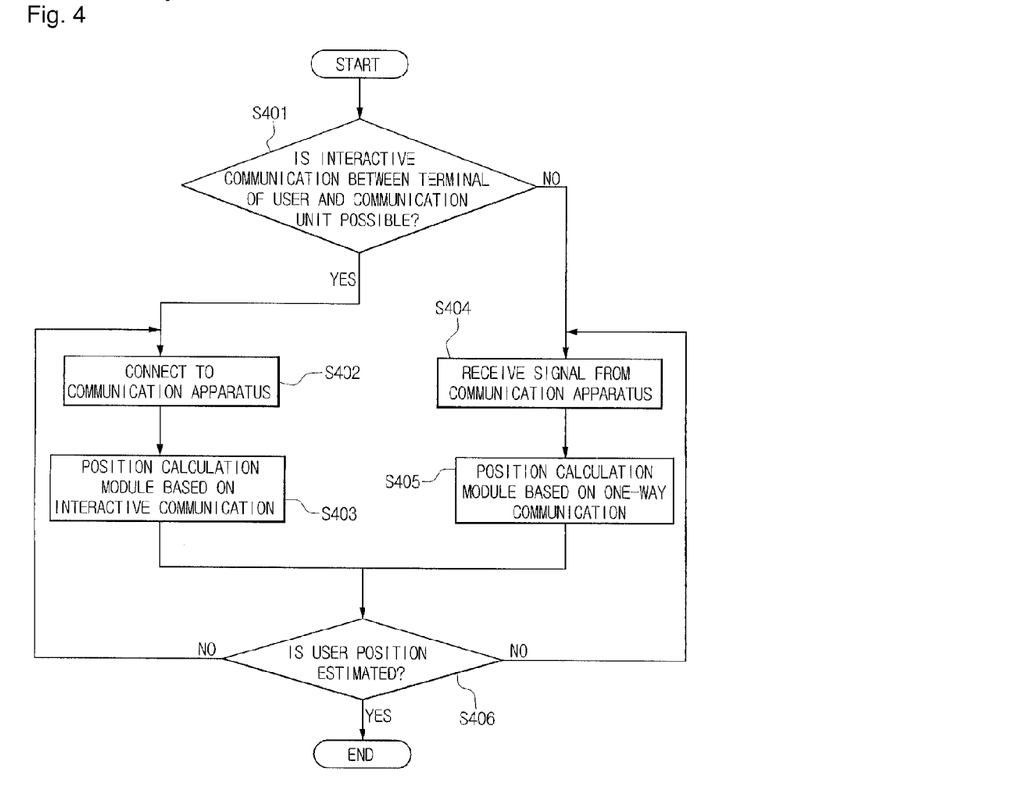
FIG. 4 is a flowchart of an algorithm of estimating a position of a user in a terminal of the positioning system based on a radio communication apparatus including multiple antennas according to the embodiment of the disclosure.

FIG. 4 is a flowchart of an algorithm of estimating a position of a user in the position calculation module of the positioning system based on a radio communication apparatus including multiple antennas according to the embodiment of the disclosure.

It is possible to calculate a position of a user using various methods depending on whether or not the terminal of the user can perform interactive communication (S401). The position calculation algorithms of the position calculation module in the positioning system according to this embodiment of the disclosure may be classified into five algorithms. There are three algorithms for interactive communication, and two for one-way communication.

In the case where the terminal can perform the interactive communication, the terminal connects to the communication apparatus by transmitting a signal (S402). In addition, a result of communication between the terminal and the communication apparatus is transmitted to the position calculation module based on interactive communication (S403), and the user position is estimated by the position calculation module based on interactive communication (S406).

On the other hand, in the case where the terminal can perform the one-way communication, the terminal receives a signal from the communication apparatus (S404). A result of reception of the terminal is transmitted to the position calculation module based on one-way communication (S405), the user position is estimated by the position calculation module based on one-way communication (S406).

Now, the position calculation algorithm in the positioning system based on a radio communication apparatus including multiple antennas according to this embodiment of the disclosure will be described with reference to FIGS. 5 to 9.

Figure 5:
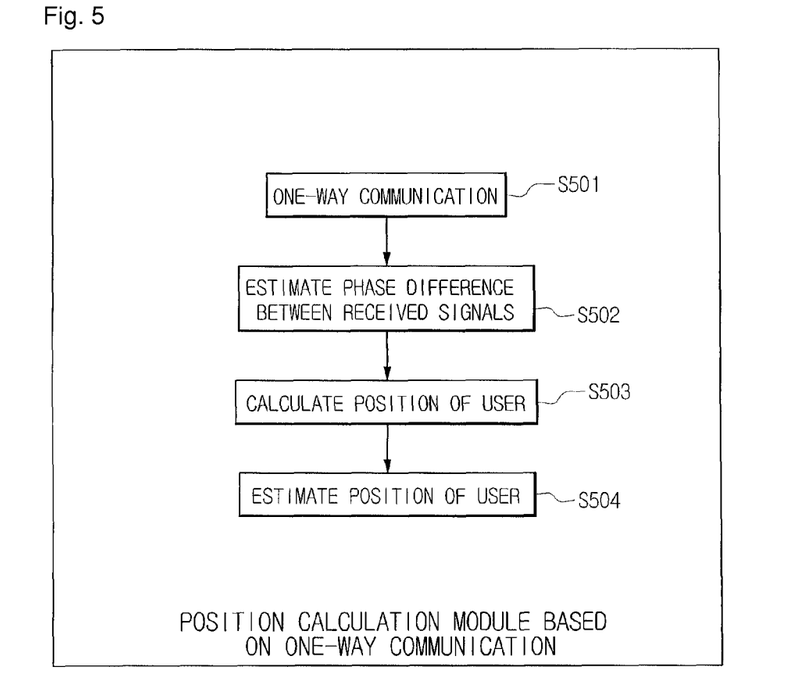
FIG. 5 is a flowchart of an algorithm of directly calculating a position using a phase difference between received signals in a case where one-way communication is used by the positioning system based on a radio communication apparatus including multiple antennas according to the embodiment of the disclosure.

FIG. 5 is a flowchart of an algorithm of directly calculating a position using a phase difference between received signals in a case where one-way communication is used by the positioning system based on a radio communication apparatus including multiple antennas according to the embodiment of the disclosure.

A one-way communication module receives a result of one-way communication (S501). A phase difference between received signals is measured (S502). Here, according to Equation 8, it is possible to estimate a distance difference between the actual antenna and the terminal using a phase difference between received signals. When this is applied to all the antennas, the following equation is obtained.

MathFigure 9

$$^1\nabla^2 d = \left(\frac{^1\nabla^2\phi}{\lambda} - \text{round}\left(\frac{^1\nabla^2\phi}{\lambda}\right)\right) \cdot \lambda \qquad [\text{Math.9}]$$

$$^1\nabla^3 d = \left(\frac{^1\nabla^3\phi}{\lambda} - \text{round}\left(\frac{^1\nabla^3\phi}{\lambda}\right)\right) \cdot \lambda$$

Here, when Equation 9 is arranged with regard to the position of the antenna of the communication apparatus and the user position, the following equation is obtained.

MathFigure 10

$$^i\nabla^j d = \sqrt{(x_i-x)^2+(y_i-y)^2+(z_i-z)^2} - \sqrt{(x_j-x)^2+(y_j-y)^2+(z_j-z)^2} \qquad [\text{Math. 10}]$$

where ($x_i$, $y_i$, $z_i$): position of the i-th antenna of the communication apparatus ($x_j$, $y_j$, $z_j$): position of the j-th antenna of the communication apparatus (x, y, z): actual position of the terminal of the user (since the actual position is two-dimensional, z is a known value)

Figure 6:
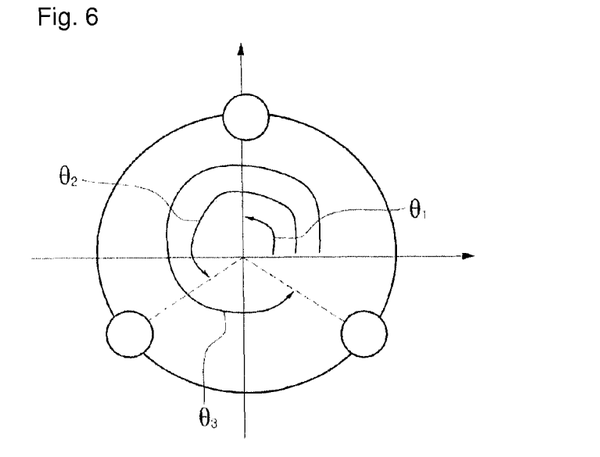
FIG. 6 is a diagram illustrating an antenna arrangement for explaining the algorithm of FIG. 5.

Since a total of three antennas are used, an equation as described may be obtained. In addition, since there are two unknown quantities x and y and two measurement equations, the equations may be solved to obtain position solutions x and y (S502). There are various methods of solving the equation, and when one of the methods is used, the position solutions may be obtained as follows. Assuming that the antennas of the communication apparatus are arranged as illustrated in FIG. 6, the position solutions may be obtained by the following equation.

MathFigure 11

$$x = \frac{-b \pm \sqrt{b^2 - 4 \cdot a \cdot c}}{2 \cdot a} \qquad [\text{Math.11}]$$

$$y = A \cdot x + B$$

where $$A = \frac{(\cos\theta_1 - \cos\theta_2) \cdot ^3\nabla^1 d - (\cos\theta_1 - \cos\theta_3) \cdot ^2\nabla^1 d}{(\sin\theta_1 - \sin\theta_2) \cdot ^3\nabla^1 d - (\sin\theta_1 - \sin\theta_3) \cdot ^2\nabla^1 d}$$

$$B = -\frac{2\nabla^1 d \cdot ^3\nabla^1 d \cdot (^3\nabla^1 d - ^2\nabla^1 d)}{2 \cdot r\{(\sin\theta_1 - \sin\theta_2) \cdot ^3\nabla^1 d - (\sin\theta_1 - \sin\theta_3) \cdot ^2\nabla^1 d\}}$$

$$a = 4 \cdot [r^2 \cdot \{\cos\theta_1 - \cos\theta_2 + A \cdot (\sin\theta_1 - \sin\theta_2)\}^2 - ^2\nabla^1 d \cdot (1 + A^2)]$$

$$b = 4 \cdot \begin{bmatrix} r \cdot \{\cos\theta_1 - \cos\theta_2 + A \cdot (\sin\theta_1 - \sin\theta_2)\} \cdot \\ \{2 \cdot r \cdot B \cdot (\sin\theta_1 - \sin\theta_2) - ^2\nabla^1 d^2\} - \\ 2 \cdot ^2\nabla^1 d^2 \cdot \{A \cdot (B - r \cdot \sin\theta_1) - r \cdot \cos\theta_1\} \end{bmatrix}$$

$$c = \{2 \cdot r \cdot B \cdot (\sin\theta_1 - \sin\theta_2) - ^2\nabla^1 d^2\}^2 - 4 \cdot ^2\nabla^1 d^2 \cdot (B^2 - 2 \cdot B \cdot r \cdot \sin\theta_1 + r^2 + (z_s - z)^2)$$

$$r = \text{radius}$$

By using the position solutions x and y obtained as described above, the position of the user may be obtained (S503). A pair of solutions may be obtained from the above equation. When Equation 10 is substituted by the obtained solutions, solutions that are not true values do not satisfy the equation, so that desired solutions may be obtained.

Figure 7:
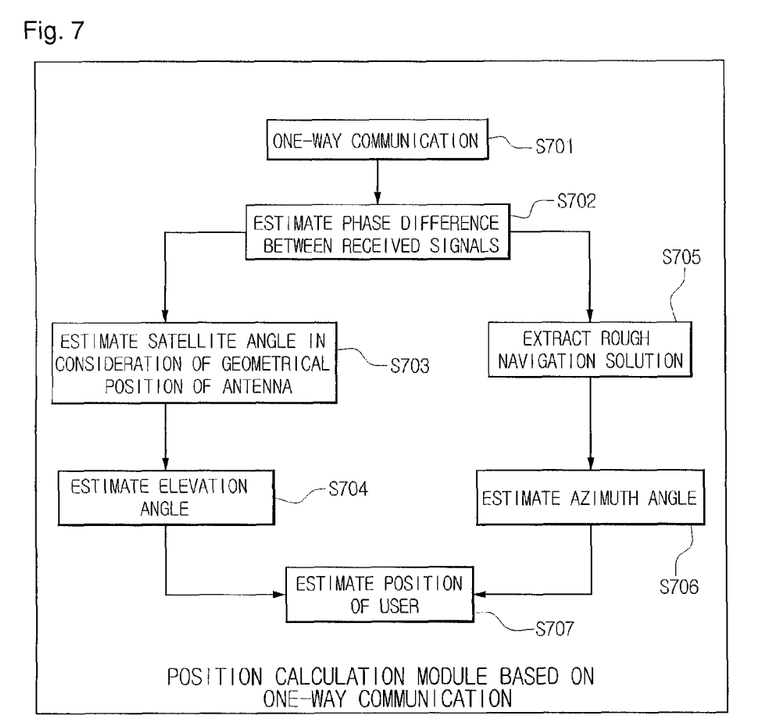
FIG. 7 is a flowchart of an algorithm of calculating a position by estimating an elevation angle and an azimuth angle using a phase difference between received signals in a case where one-way communication is used by the positioning system based on a radio communication apparatus including multiple antennas according to the embodiment of the disclosure.

FIG. 7 is a flowchart of an algorithm of calculating a position by estimating an elevation angle and an azimuth angle using a phase difference between received signals in a case where one-way communication is used by the positioning system based on a radio communication apparatus including multiple antennas according to the embodiment of the disclosure.

The one-way communication module cannot estimate the distance between the terminal and the communication apparatus unlike the interactive communication module which will be described later. However, estimating an elevation angle using a phase difference between signals transmitted from the antennas without calculating the distance is possible. In addition, when the position is calculated using the phase difference, due to geometrical characteristics of the antenna arrangement, the position solutions are distributed longitudinally in an antenna direction. By applying the characteristics, information on the azimuth angle can be relatively accurately acquired from the position solutions. As described above, it is possible to estimate the position of the user by obtaining the elevation angle and the azimuth angle.

The terminal receives the signals transmitted from the communication antennas of the communication apparatus (S701) and measures a phase difference between the signals (S702). Here, the phase difference between the signals received by the terminal may be modeled by the following equation.

MathFigure 12

$$_1\Delta_2\phi = _1\Delta_2 d$$

$$_1\Delta_3\phi = _1\Delta_3 d$$

$$_2\Delta_3\phi = _2\Delta_3 d \qquad [\text{Math. 12}]$$

According to Equation 12, the phase difference between the signals may be calculated after receiving the signals (S702), and the phase difference is the same as differences in distance from the terminal to the antennas. The elevation angle and the azimuth angle are obtained by using the phase difference obtained as described above.

First, a method of calculating the elevation angle will be described with reference to FIG. 8.

Figure 8:
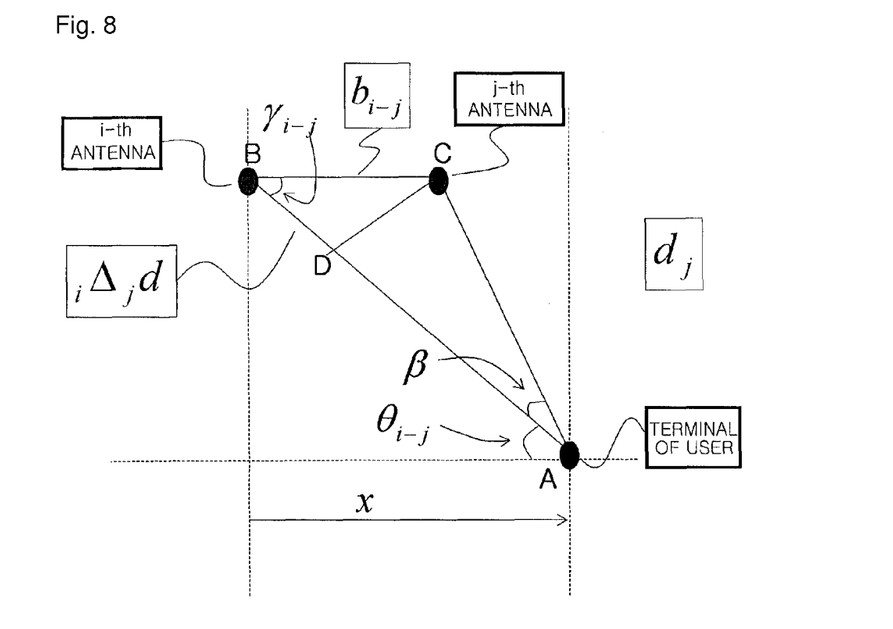
FIG. 8 is a diagram for explaining a method of calculating an elevation angle by a position calculation module based on one-way communication according to the embodiment of the disclosure.

In a triangle ABC of FIG. 8, since a side BC which is a distance between the antennas has to be shorter than the wavelength of an RF signal, the side BC is very short. On the contrary, a distance x between the user and the antenna is relatively long. Therefore, an angle

β is very small. Since a side AD and a side AC of a triangle ACD are the same, the triangle ACD is an isosceles triangle, and since the angle

β is very small, it can be assumed that an angle ADC of the triangle ACD is close to a right angle. Therefore, an angle BDC of a triangle BDC is a right angle, and an angle $\gamma_{i-j}$ may be estimated using the following equation (S703, see FIG. 7).

MathFigure 13

$$\gamma_{i-j} = \cos^{-1}\left(\frac{i\Delta_j d}{b_{i-j}}\right) \quad \text{[Math. 13]}$$

where $b_{i-j}$ is a distance between the i-th antenna and the j-th antenna.

However, since the terminal is not placed on the same plane as that of the two antennas, this value is not accurate. If the terminal is placed on the same plane, the value $\gamma_{i-j}$ has to be smallest. Therefore, the value $\gamma_{i-j}$ is calculated by applying the above-mentioned method to each of the antennas and the smallest value is selected from the calculated values. That is, the minimum value from among the values $\gamma_{i-j}$ is determined as the elevation angle (S704, see FIG. 7).

The elevation angle is obtained by the method described above, and a method of obtaining the azimuth angle will now be described. A rough position of the user may be calculated using the phase difference between the signals transmitted from the antennas, the phase difference being obtained by Equation 12 (S705). However, since the distance between the antennas is very short, there is a problem in that convergence does not occur when the position is calculated. In order to solve the problem, calculation using a direct method is more advantageous than an iterative method. Even when the direct method is used for the calculation, due to geometrical characteristics in which the antennas are concentrated on one side, navigation solutions are distributed widely in the corresponding direction. Thus, the azimuth angle can be obtained (S706).

Figure 9:
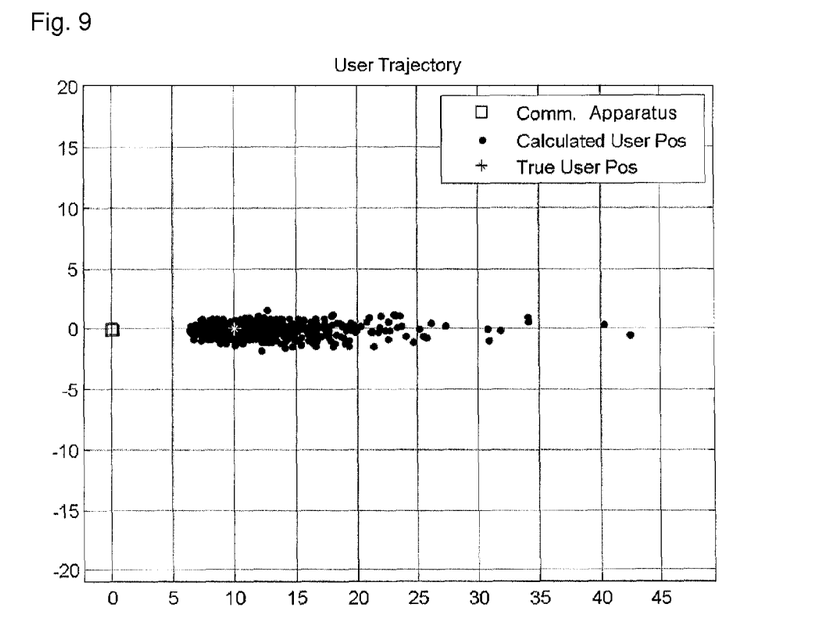
FIG. 9 is a diagram showing results of a simulation of calculating rough positions of a user using a direct method.

FIG. 9 is a diagram showing results of a simulation of calculating rough positions of a user using the direct method. Here, the communication apparatus is positioned at (0, 0), and the user is positioned at (10, 0). The position of the user calculated by the direct method is distributed widely in the left and right direction and distributed narrowly in the up and down direction. This is caused by geometrical characteristics in which the antennas are located focused on the left of the user. Therefore, when the position solutions are obtained by the direct method described above, the position of the user may not be accurate. However, the information on the azimuth angle that indicates which direction is the user positioned with respect to the communication apparatus on the two-dimensional plane can be obtained relatively accurately.

Therefore, the position calculation module based on one-way communication estimates the two-dimensional position of the user using the elevation angle and the azimuth angle (S707).

Figure 10:
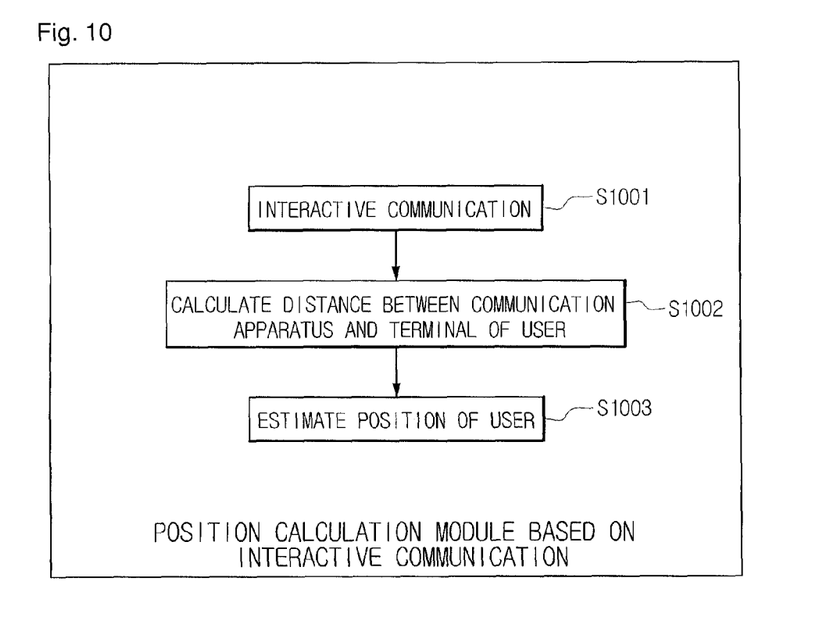
FIG. 10 is a flowchart of an algorithm of calculating a position by directly calculating a distance when interactive communication is used by the positioning system based on a radio communication apparatus including multiple antennas according to the embodiment of the disclosure.

FIG. 10 is a flowchart of an algorithm of calculating a position by directly calculating a distance when interactive communication is used by the positioning system based on a radio communication apparatus including multiple antennas according to the embodiment of the disclosure.

The position calculation module based on interactive communication receives results of the interactive communication (S1001) and calculates a distance between the communication apparatus and the terminal using a round trip communication technique as represented by the following equation (S1002).

MathFigure 14

$$d_{round\_trip} = c \cdot (t_{receive} - t_{transmit} - t_{delay})/2 \quad \text{[Math. 14]}$$

where $d_{round\_trip}$: distance measured based on a round trip signal $t_{receive}$: time at which the terminal of the user receives a signal $t_{transmit}$: time at which the terminal of the user transmits a signal $t_{delay}$: time delay until the communication apparatus transmits a signal after receiving the signal.

Therefore, the position calculation module based on interactive communication estimates the position of the user using the distance between the communication apparatus and the terminal, the distance being obtained using the above equation (S1003). It is difficult to obtain two or more dimensional position of the user using the method described with reference to FIG. 10, but the method is effective for obtaining the one-dimensional position.

Figure 11:
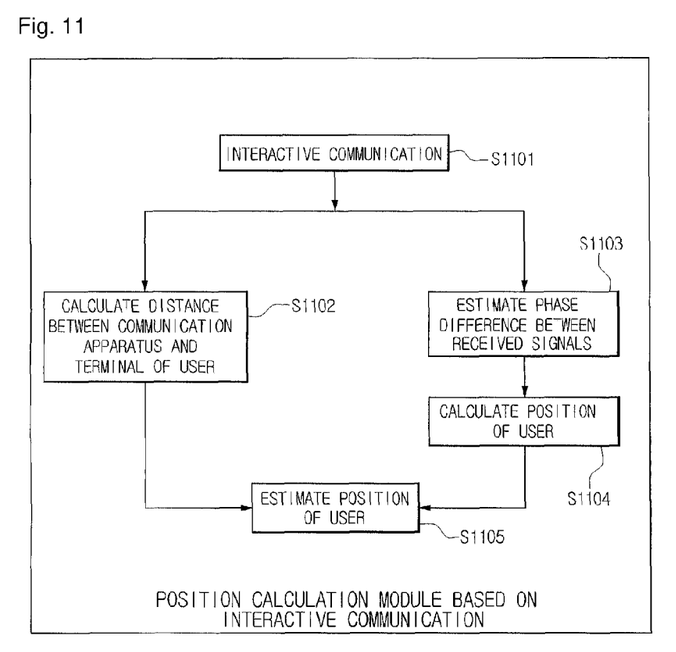
FIG. 11 is a flowchart of an algorithm of calculating a position using a distance and a phase difference between received signals when interactive communication is used by the positioning system based on a radio communication apparatus including multiple antennas according to the embodiment of the disclosure.

FIG. 11 is a flowchart of an algorithm of calculating a position using a distance and a phase difference between received signals when interactive communication is used by the positioning system based on a radio communication apparatus including multiple antennas according to the embodiment of the disclosure.

Referring to FIG. 11, the position calculation module based on interactive communication receives the result of the interactive communication (S1101) and calculates the distance between the communication apparatus and the terminal using the interactive communication technique (S1102). The steps S1101 and S1102 are the same as the steps S1001 and 1002 described with reference to FIG. 10.

The positioning system based on a radio communication apparatus according to this embodiment measures the phase difference between the received signals (S1103) and calculates the position of the user (S1104). The steps S1103 and 1104 are the same as the steps S502 and S503 described with reference to FIG. 5.

When the distance between the communication apparatus and the terminal and the position of the user are calculated, the results are combined to accurately estimate the two-dimensional position of the user (S1105).

Figure 12:
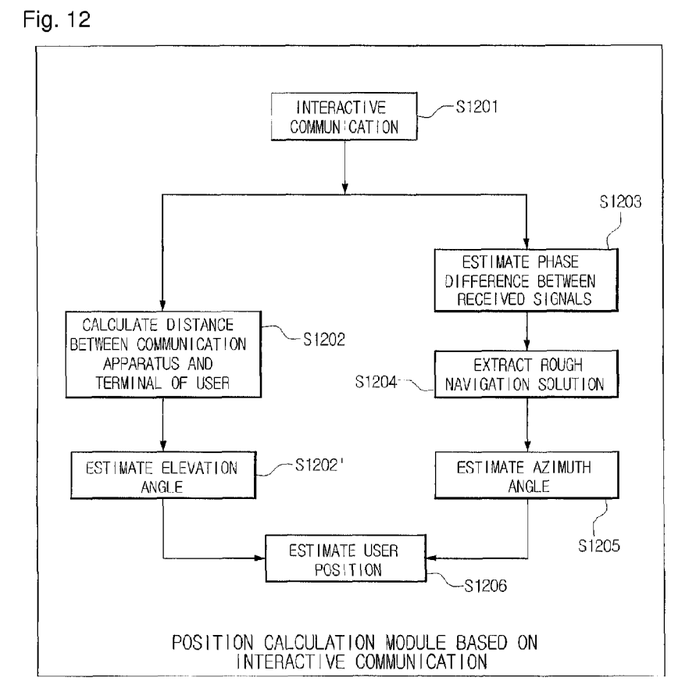
FIG. 12 is a flowchart of an algorithm of calculating a position using a distance and an azimuth angle, or an elevation angle and the azimuth angle when interactive communication is used by the positioning system based on a radio communication apparatus including multiple antennas according to the embodiment of the disclosure.

FIG. 12 is a flowchart of an algorithm of calculating a position using a distance and an azimuth angle, or using an elevation angle and the azimuth angle when interactive communication is used by the positioning system based on a radio communication apparatus including multiple antennas according to the embodiment of the disclosure.

Referring to FIG. 12, the position calculation module based on interactive communication receives results of the interactive communication (S1201) and calculates the distance between the communication apparatus and the terminal using the interactive communication technique (S1202). The steps S1201 and S1202 are the same as the steps S1001 and S1002 described with reference to FIG. 10.

Here, a step S1202 of calculating an elevation angle after the step S1202 of calculating a distance may be added. In this case, the elevation angle is calculated from the distance between the communication apparatus and the terminal, the distance being calculated in the step S1202. Considering that the height of the communication apparatus is known, an equation of calculating the elevation angle is represented as follows:

MathFigure 15

$$\theta = \sin^{-1}\left(\frac{h}{d_{round\_trip}}\right) \qquad [\text{Math. 15}]$$

Where
θ: elevation angle
h: height of a communication apparatus.

The step S1202 of calculating the elevation angle is not an essential process and may be added or omitted as needed.

The positioning system based on a radio communication apparatus according to this embodiment of the disclosure measures the phase difference between the received signals (S1203), calculates the rough position of the user using the measured phase difference (S1204), and estimates an azimuth angle (S1205). The steps 1203 to 1205 are the same as the steps S702, S705, and S706 described with reference to FIG. 7.

The distance between the communication apparatus and the terminal and the azimuth angle, or the elevation angle and the azimuth angle are calculated as described above, the results thereof are combined to accurately estimate the two-dimensional position of the user (S1205).

Figure 13:
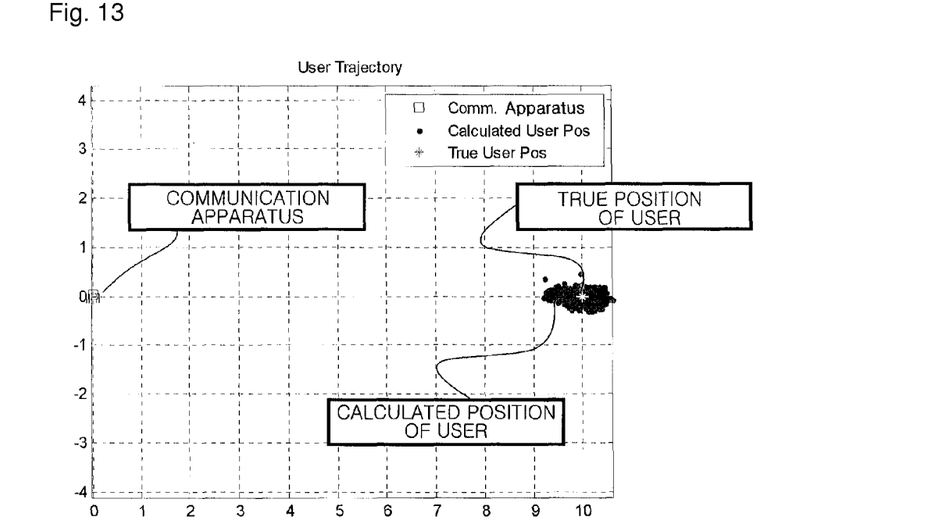
FIG. 13 is a diagram showing results of a simulation of calculating a position of a user using a position calculation module based on interactive communication according to the embodiment of the disclosure.

FIG. 13 is a diagram showing results of a simulation of calculating a position of a user using a position calculation module based on interactive communication according to the embodiment of the disclosure. When the calculated position of the user is compared with the true position of the user, it can be seen that an error range is significantly reduced as compared with the result calculated by the direct method illustrated in FIG. 6. Particularly, errors in the direction toward the communication apparatus are significantly reduced.

Figure 14:
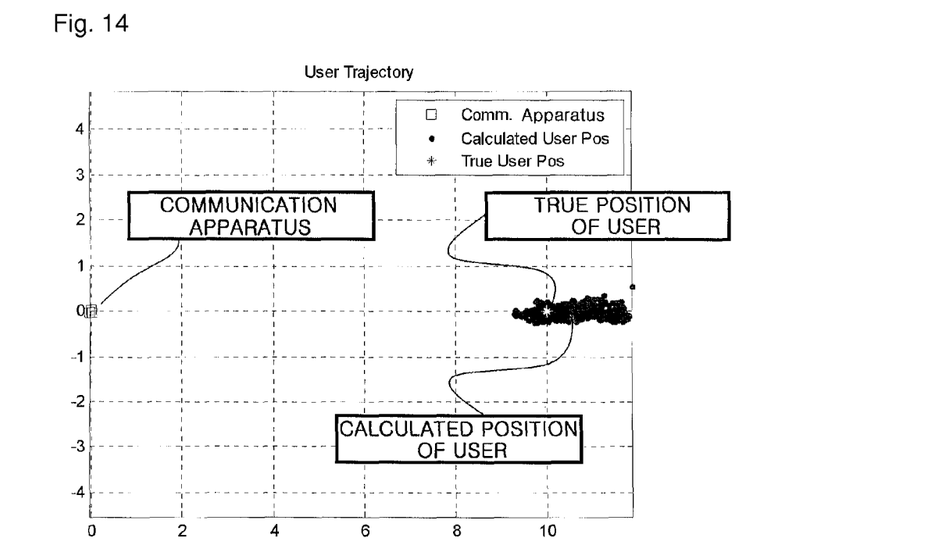
FIG. 14 is a diagram showing results of a simulation of calculating a position of a user using a position calculation module based on one-way communication according to the embodiment of the disclosure.

FIG. 14 is a diagram showing results of a simulation of calculating a position of a user using a position calculation module based on one-way communication according to the embodiment of the disclosure. When the calculated position of the user is compared with the true position of the user, it can be seen that an error range is significantly reduced as compared with the result calculated by the direct method although the error range is slightly wider than the result obtained by the position calculation module based on interactive communication.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The invention claimed is:

1. A positioning system based on a radio communication apparatus including multiple antennas, comprising:
    a communication apparatus including multiple antennas and generating or relaying a communication signal; and
    a position calculation module calculating a position of a terminal using a phase difference between signals that are transmitted from the multiple antennas to the terminal,
    wherein the position calculation module comprises a position calculation module based on interactive communication or one-way communication, and
    wherein the phase difference is obtained by subtracting carrier-phase measurements of the signals from each other.

2. The positioning system according to claim 1, wherein the position calculation module is included in the terminal.

3. The positioning system according to claim 1, wherein the position calculation module is provided separately from the terminal.

4. The positioning system according to claim 1, wherein the communication signal is a signal selected from the group consisting of a ranging signal, a carrier signal, and a sub-carrier signal.

5. The positioning system according to claim 1, wherein the communication apparatus performs communication in a manner selected from the group consisting of artificial satellite, ground beacon, pseudo-satellite, wireless LAN (Wi-Fi, WLAN), Wibro, mobile communication, Bluetooth, UWB, infrared rays, ultrasonic waves, Zigbee, wireless USB, RFID, active RFID, and broadcasting signals.

6. The positioning system according to claim 1, wherein the position calculation module based on interactive communication comprises:
    a distance calculation unit calculating a distance between the terminal and the communication apparatus through interactive communication; and
    a position estimation unit estimating a position of the terminal using the distance.

7. The positioning system according to claim 1, wherein the position calculation module based on interactive communication comprises:
    a distance calculation unit calculating a distance between the terminal and the communication apparatus through interactive communication;
    a phase difference calculation unit calculating a phase difference between signals transmitted from the multiple antennas to the terminal;
    a position calculation unit calculating a position of the terminal using the phase difference between the signals transmitted from the multiple antennas; and
    a position estimation unit estimating the position of the terminal using the distance and the calculated position of the terminal.

8. The positioning system according to claim 1, wherein the position calculation module based on interactive communication comprises:
a distance calculation unit calculating a distance between the terminal and the communication apparatus through interactive communication;
a phase difference calculation unit calculating a phase difference between signals transmitted from the multiple antennas to the terminal;
an azimuth angle calculation unit calculating an azimuth angle from a phase difference between the signals transmitted from the multiple antennas; and
a position estimation unit estimating a position of the terminal using the distance and the azimuth angle.

9. The positioning system according to claim 1, wherein the position calculation module based on interactive communication comprises:
a distance calculation unit calculating a distance between the terminal and the communication apparatus through interactive communication;
an elevation angle calculation unit calculating an elevation angle based on the distance;
a phase difference calculation unit calculating a phase difference between signals transmitted from the multiple antennas to the terminal;
an azimuth angle calculation unit calculating an azimuth angle from the phase difference between the signals transmitted from the antennas; and
a position estimation unit estimating a position of the terminal using the elevation angle and the azimuth angle.

10. The positioning system according to claim 6, wherein, assuming that the distance between the terminal and the communication apparatus is $d_{round\_trip}$, a time at which the terminal receives the signal is $t_{receive}$, time at which the terminal transmits the signal is $t_{transmit}$, and a time delay until the communication apparatus transmits the signal after receiving the signal is $t_{delay}$, the distance calculation unit obtains a distance between the terminal and the communication apparatus using an equation:

$$d_{round\_trip} = c \cdot (t_{receive} - t_{transmit} - t_{delay})/2.$$

11. The positioning system according to claim 9, wherein, assuming that a distance between the terminal and the communication apparatus is $d_{round\_trip}$, the elevation angle is $\theta$, and a height of the antenna of the communication apparatus is h, the elevation angle calculation unit obtains the elevation angle using an equation:

$$\theta = \sin^{-1}\left(\frac{h}{d_{round\_trip}}\right).$$

12. The positioning system according to claim 1, wherein the position calculation module based on one-way communication comprises:
a phase difference calculation unit calculating a phase difference between signals transmitted from the multiple antennas to the terminal;
a position calculation unit calculating the position of the terminal using the phase difference between the signals transmitted from the multiple antennas; and
a position estimation unit estimating the position of the terminal using the calculated position of the terminal.

13. The positioning system according to claim 1, wherein the position calculation module based on one-way communication comprises:

a phase difference calculation unit calculating a phase difference between signals transmitted from the multiple antennas to the terminal;
an elevation angle calculation unit calculating an elevation angle from the phase difference between the signals transmitted from the multiple antennas;
an azimuth angle calculation unit calculating an azimuth angle from the phase difference between the signals transmitted from the multiple antennas; and
a position estimation unit estimating a position of the terminal using the elevation angle and the azimuth angle.

14. The positioning system according to claim 13, wherein, assuming that an angle between an i-th antenna and the terminal on a line connecting the i-th antenna and a j-th antenna from among the multiple antennas is $\gamma_{i-j}$, a difference between a distance between the i-th antenna and the terminal and a distance between the j-th antenna and the terminal is $_i\Delta_j d$, and a distance between the i-th antenna and the j-th antenna is $b_{i-j}$, the elevation calculation unit determines a minimum value from among the values $\gamma_{i-j}$ calculated by an equation:

$$\gamma_{i-j} = \cos^{-1}\left(\frac{_i\Delta_j d}{b_{i-j}}\right)$$

as the elevation angle.

15. The positioning system according to claim 7 or 12, wherein, assuming that a phase difference between an i-th antenna and a j-th antenna is $_i\Delta_j\phi$, and a distance between the i-th antenna and the j-th antenna is $_i\Delta_j d$, the phase difference calculation unit obtains the phase difference between the signals transmitted from the multiple antennas using an equation:

$$_i\Delta_j\phi = {_i\Delta_j d}.$$

16. The positioning system according to claim 7 or 12, wherein, assuming that $(x_i, y_i, z_i)$ is a position of an i-th antenna from among the multiple antennas, $(x_j, y_j, z_j)$ is a position of a j-th antenna from among the multiple antennas, and (x, y, z) is an actual position of the terminal, a position calculation unit obtains x and y by solving a measurement equation:

$$_i\nabla^j d = \sqrt{(x_i-x)^2+(y_i-y)^2+(z_i-z)^2} - \sqrt{(x_j-x)^2+(y_j-y)^2+(z_j-z)^2}.$$

17. A positioning method based on a radio communication apparatus including multiple antennas, comprising:
allowing a communication apparatus which includes multiple antennas for generating or relaying a communication signal to communicate with a terminal; and
calculating a position of the terminal using a phase difference between signals transmitted from the multiple antennas to the terminal,
wherein said calculating of the position includes calculating a position based on interactive communication or one-way communication, and
wherein the phase difference is obtained by subtracting carrier-phase measurements of the signals from each other.

18. The positioning method according to claim 17, wherein said calculating of the position based on the interactive communication comprises:
calculating a distance between the terminal and the communication apparatus through the interactive communication; and
estimating a position of the terminal using the distance.

19. The positioning method according to claim 17, wherein said calculating of the position based on the interactive communication comprises:
- calculating a distance between the terminal and the communication through interactive communication;
- calculating a phase difference between signals transmitted from the multiple antennas to the terminal;
- calculating a position of the terminal using the phase difference between the signals transmitted from the multiple antennas; and
- estimating a position of the terminal using the distance and the position of the terminal.

20. The positioning method according to claim 17, wherein said calculating of the position based on the interactive communication comprises:
- calculating a distance between the terminal and the communication apparatus through the interactive communication;
- calculating a phase difference between signals transmitted from the multiple antennas to the terminal;
- calculating an azimuth angle from the phase difference between the signals transmitted from the multiple antennas; and
- estimating a position of the terminal using the distance and the azimuth angle.

21. The positioning method according to claim 17, wherein said calculating of the position based on the interactive communication comprises:
- calculating a distance between the terminal and the communication apparatus through the interactive communication;
- calculating an elevation angle based on the distance;
- calculating a phase difference between signals transmitted from the multiple antennas to the terminal;
- calculating an azimuth angle from the phase difference between the signals transmitted from the multiple antennas; and
- estimating a position of the terminal using the elevation angle and the azimuth angle.

22. The positioning method according to claim 17, wherein, assuming that a distance between the terminal and the communication apparatus is $d_{round\_trip}$, a time at which the terminal receives the signal is $t_{receive}$, a time at which the terminal transmits the signal is $t_{transmit}$, and a time delay until the communication apparatus transmits the signal after receiving the signal is $t_{delay}$, in said calculating of the distance, the distance between the terminal and the communication apparatus is obtained by an equation:

$$d_{round\_trip} = c \cdot (t_{receive} - t_{transmit} - t_{delay})/2.$$

23. The positioning method according to claim 21, wherein, assuming that a distance between the terminal and the communication apparatus is $d_{round\_trip}$, the elevation angle is $\theta$, and a height of the antenna of the communication apparatus is h, in said calculating of the elevation angle, the elevation angle is obtained by an equation:

$$\theta = \sin^{-1}\left(\frac{h}{d_{round\_trip}}\right).$$

24. The positioning method according to claim 17, further comprising:
- calculating a phase difference between signals transmitted from the multiple antennas to the terminal;
- calculating a position of the terminal using a phase difference between the signals transmitted from the multiple antennas; and
- estimating a position of the terminal using the calculated position of the terminal.

25. The positioning method according to claim 17, wherein said calculating of the position based on the one-way communication comprises:
- calculating a phase difference between signals transmitted from the multiple antennas to the terminal;
- calculating an elevation angle from the phase difference between the signals transmitted from the multiple antennas;
- calculating an azimuth angle from the phase difference between the signals transmitted from the multiple antennas; and
- estimating a position of the terminal using the elevation angle and the azimuth angle.

26. The positioning method according to claim 25, wherein, assuming that an angle between an i-th antenna and the terminal on a line connecting the i-th antenna and a j-th antenna from among the multiple antennas is $\gamma_{i-j}$, a difference between a distance between the i-th antenna and the terminal and a distance between the j-th antenna and the terminal is $_i\Delta_j d$, and a distance between the i-th antenna and the j-th antenna is $b_{i-j}$, in said calculating of the elevation angle, a minimum value from among the values $\gamma_{i-j}$ calculated by an equation:

$$\gamma_{i-j} = \cos^{-1}\left(\frac{_i\Delta_j d}{b_{i-j}}\right)$$

is determined as the elevation angle.

27. The positioning method according to claim 17, wherein, assuming that a phase difference between an i-th antenna and a j-th antenna is $_i\Delta_j \phi$, and a distance between the i-th antenna and the j-th antenna is $_i\Delta_j d$, in said calculating of the phase difference between the signals transmitted from the multiple antennas, the phase difference between the signals transmitted from the multiple antennas is obtained using an equation:

$$_i\Delta_j \phi = _i\Delta_j d.$$

28. The positioning system according to claim 17, wherein, assuming that $(x_i, y_i, z_i)$ is a position of an i-th antenna from among the multiple antennas, $(x_j, y_j, z_j)$ is a position of a j-th antenna from among the multiple antennas, and $(x, y, z)$ is an actual position of the terminal, in said calculating of the position of the terminal, x and y are obtained by solving a measurement equation represented as an equation:

$$^i\nabla^j d = \sqrt{(x_i-x)^2+(y_i-y)^2+(z_i-z)^2} - \sqrt{(x_j-x)^2+(y_j-y)^2+(z_j-z)^2}.$$

* * * * *